(12) United States Patent
Flordelis et al.

(10) Patent No.: US 12,395,871 B2
(45) Date of Patent: Aug. 19, 2025

(54) BEAM MANAGEMENT FOR FREQUENCY DIVISION DUPLEX OPERATION

(71) Applicant: Sony Group Corporation, Tokyo (JP)

(72) Inventors: Jose Flordelis, Lund (SE); Fredrik Rusek, Eslöv (SE); Olof Zander, Södra Sandby (SE); Kun Zhao, Malmö (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 393 days.

(21) Appl. No.: 17/758,349

(22) PCT Filed: Jan. 14, 2021

(86) PCT No.: PCT/EP2021/050667
§ 371 (c)(1),
(2) Date: Jul. 1, 2022

(87) PCT Pub. No.: WO2021/144352
PCT Pub. Date: Jul. 22, 2021

(65) Prior Publication Data
US 2023/0069193 A1   Mar. 2, 2023

(30) Foreign Application Priority Data
Jan. 14, 2020   (SE) .................... 2030010-9

(51) Int. Cl.
*H04W 24/08*  (2009.01)
*H04L 5/00*  (2006.01)
(Continued)

(52) U.S. Cl.
CPC .......... *H04W 24/08* (2013.01); *H04L 5/0051* (2013.01); *H04L 5/14* (2013.01); *H04W 74/0841* (2013.01)

(58) Field of Classification Search
CPC .... H04B 7/0404; H04B 7/063; H04B 7/0695; H04B 7/06952; H04B 7/06954;
(Continued)

(56) References Cited

U.S. PATENT DOCUMENTS

2015/0163036 A1   6/2015   Thomas
2017/0111895 A1   4/2017   Tiirola
(Continued)

FOREIGN PATENT DOCUMENTS

WO   2017011802 A1   1/2017
WO   2018084800 A1   5/2018
WO   2019139844 A1   4/2019

OTHER PUBLICATIONS

International Search Report and Written Opinion from corresponding International Application No. PCT/EP2021/050667, Mar. 29, 2021, 15 pages.
(Continued)

*Primary Examiner* — Stephen J Clawson
(74) *Attorney, Agent, or Firm* — Tucker Ellis LLP

(57) ABSTRACT

A method of operating a wireless communication device (102) configured to communicate with a communications network (100) using frequency duplex transmission in an uplink frequency band (601) and in a downlink frequency band (602) is provided. The method includes monitoring for first downlink reference signals (445, 6052) transmitted by an access node (101) of the communications network (100) in the uplink frequency band (601) and using multiple first downlink transmit beams (351-354); and monitoring for second downlink reference signals (411, 446) transmitted by the access node (101) of the communications network (100) in the downlink frequency band (602) and using multiple second downlink transmit beams (361-364).

12 Claims, 10 Drawing Sheets

(51) Int. Cl.
   *H04L 5/14* (2006.01)
   *H04W 74/0833* (2024.01)
(58) Field of Classification Search
   CPC ............ H04B 7/06956; H04B 7/06958; H04B 7/0696; H04B 7/06962; H04B 7/06964; H04B 7/06966; H04B 7/06968; H04W 74/0833; H04W 74/0841; H04W 74/0836; H04W 74/0838
   See application file for complete search history.

(56) References Cited

U.S. PATENT DOCUMENTS

| | | | | |
|---|---|---|---|---|
| 2017/0181132 | A1* | 6/2017 | Xiao | H04B 7/0639 |
| 2017/0279504 | A1 | 9/2017 | Chen | |
| 2017/0331577 | A1* | 11/2017 | Parkvall | H04L 5/1469 |
| 2018/0287739 | A1* | 10/2018 | Kim | H04J 11/0023 |
| 2018/0331794 | A1* | 11/2018 | Nagaraja | H04B 7/088 |
| 2019/0068266 | A1* | 2/2019 | Chang | H04L 5/0048 |
| 2019/0116605 | A1 | 4/2019 | Luo | |
| 2019/0306924 | A1* | 10/2019 | Zhang | H04B 7/063 |
| 2019/0357264 | A1* | 11/2019 | Yi | H04L 5/14 |
| 2020/0389805 | A1* | 12/2020 | Kim | H04W 24/10 |
| 2022/0217634 | A1* | 7/2022 | Sun | H04W 74/0833 |

OTHER PUBLICATIONS

Office Action and Search Report from corresponding Swedish Application No. 2030010-9, Dec. 4, 2020, 7 pages.
J. Flordelis, et al., "Massive MIMO Performance—TDD versus FDD: What do Measurements Say?", IEEE Transactions on Wireless Communications, vol. 17, No. 4, Apr. 2018, 15 pages.
W. Peng et al., "Downlink Channel Prediction for Time-Varying FDD Massive MIMO Systems," IEEE Journal of Selected Topics in Signal Processing, vol. 13, No. 5, Sep. 2019, 13 pages.
Nokia et al., "On Beam Management for NR—Reciprocity Assumptions," 3GPP TSG-RAN WG1 #86, R1-1610241, Oct. 10-14, 2016, 4 pages.
Y.R. Li et al., "Beam Management in Millimeter-Wave Communications for 5G Beyond," IEEE Access, vol. 8, Jan. 1, 2020, 12 pages.

* cited by examiner ary examples of the invention generally relate to beam management for frequency division duplex operation. Various examples of the invention specifically relate to beam management during initial access of a wireless communication device to a cellular network.

BEAM MANAGEMENT FOR FREQUENCY DIVISION DUPLEX OPERATION

TECHNICAL FIELD

Various examples of the invention generally relate to beam management for frequency division duplex operation. Various examples of the invention specifically relate to beam management during initial access of a wireless communication device to a cellular network.

BACKGROUND

Various techniques are known to enhance reliability and/or throughput of communication on a wireless link.

Firstly, multiple-input multiple-output (MIMO) techniques are known. Here, the transmitter node and the receiver node both include multiple antennas that can be operated in a phase-coherent manner. Thereby, a signal can be transmitted redundantly (diversity multi-antenna operational mode) along multiple spatial data streams, or multiple signals can be transmitted on multiple spatial data streams (spatial multiplexing multi-antenna operational mode). Spatial data streams can be defined by focusing the transmission energy for transmitting (transmit beam, TX beam) and/or the receive sensitivity for receiving (receive beam, RX beam) to a particular spatial direction. Here, the process of identifying the appropriate beams is often referred to as beam establishment or beam management.

Secondly, using frequency division duplex (FDD), signals can be transmitted from a first node to a second node in a first frequency band and further signals can be transmitted contemporaneously from the second node to the first node in a second frequency band that is different from the first frequency band.

It has been found that accurate beam management can be challenging for FDD operation.

SUMMARY

Accordingly, a need exists for advanced techniques of beam management in connection with FDD operation. This need is met by the features of the independent claims. The features of the dependent claims define embodiments.

A method of operating a UE is provided. The UE is configured to communicate with a communications network using frequency duplex transmission in an uplink frequency band and in a downlink frequency band. The method includes monitoring for first downlink reference signals (RSs). The first downlink RSs are transmitted by an access node of the communications network in the uplink frequency band and using multiple first downlink transmit beams. The method also includes monitoring for second downlink RSs transmitted by the access node of the communications network in the downlink frequency band and using multiple second downlink transmit beams.

A computer program or a computer program product or a computer-readable storage medium includes program code. The program code can be loaded and executed by at least one processor. Executing the program code causes the at least one processor to perform a method of operating a UE. The UE is configured to communicate with a communications network using frequency duplex transmission in an uplink frequency band and in a downlink frequency band. The method includes monitoring for first downlink RSs. The first downlink RSs are transmitted by an access node of the communications network in the uplink frequency band and using multiple first downlink transmit beams. The method also includes monitoring for second downlink RSs transmitted by the access node of the communications network in the downlink frequency band and using multiple second downlink transmit beams.

A UE is configured to communicate with a communications network using frequency duplex transmission in an uplink frequency band and in a downlink frequency band. The UE includes control circuitry configured to monitor for first downlink RSs. The first downlink RSs are transmitted by an access node of the communications network in the uplink frequency band and using multiple first downlink transmit beams. The control circuitry is also configured to monitor for second downlink RSs transmitted by the access node of the communications network in the downlink frequency band and using multiple second downlink transmit beams.

A method of operating an access node of a communications network is provided. The access node is configured to communicate with a wireless communication device using frequency duplex transmission in an uplink frequency band and in a downlink frequency band. The method includes transmitting first downlink RSs in the uplink frequency band and using multiple first downlink transmit beams. The method also includes transmitting second downlink RSs in the downlink frequency band and using multiple second downlink transmit beams.

A computer program or a computer program product or a computer-readable storage medium includes program code. The program code can be loaded and executed by at least one processor. Executing the program code causes the at least one processor to perform a method of operating an access node of a communications network. The access node is configured to communicate with a wireless communication device using frequency duplex transmission in an uplink frequency band and in a downlink frequency band. The method includes transmitting first downlink RSs in the uplink frequency band and using multiple first downlink transmit beams. The method also includes transmitting second downlink RSs in the downlink frequency band and using multiple second downlink transmit beams.

An access node of a communications network is provided. The access node is configured to communicate with a wireless communication device using frequency duplex transmission in an uplink frequency band and in a downlink frequency band. The access node includes control circuitry configured to transmit first downlink RSs in the uplink frequency band and using multiple first downlink transmit beams; and to transmit second downlink RSs in the downlink frequency band and using multiple second downlink transmit beams.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
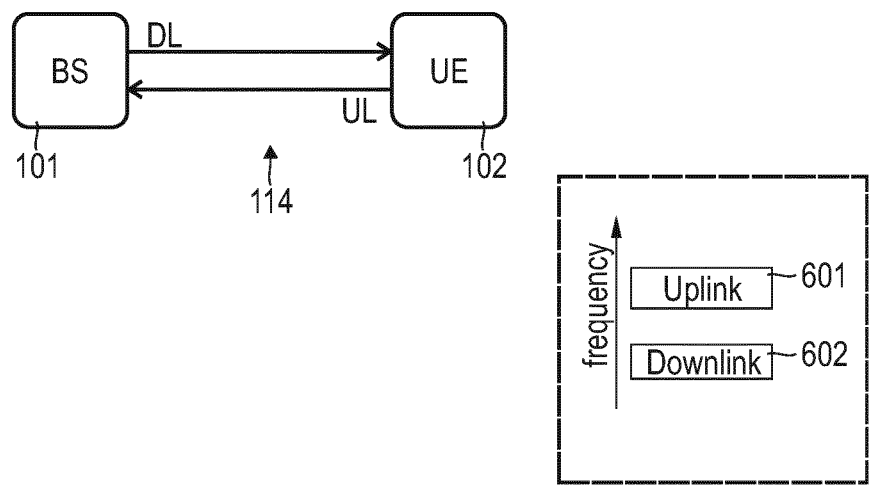
FIG. 1 schematically illustrates a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate FDD operation of communication on a wireless link. Techniques are described that facilitate FDD operation in combination with MIMO. In particular, the techniques described herein facilitate beam management during the initial access of a wireless communication device (UE) to a cellular network (NW). The techniques described herein can be used to reliably determine a downlink (DL) transmit (TX) beam at a base station (BS) of the cellular NW to be used for transmitting data to the UE in the DL frequency band of the wireless link, as well as to reliably determine in UL receive (RX) beam at the BS to be used for receiving data from the UE in the UL frequency band. Also, beam management of UE beams, i.e., an UL TX beam and/or a DL RX beam can be facilitated.

DL TX beams and UL RX beams are so-called BS beams, because they are employed by the BS. UL TX beams and DL RX beams are so-called UE beams. DL RX beams can also be referred to as RX spatial filter.

Once a beam has been determined, this beam can be used for subsequent communication of data, e.g., application data and/or higher-layer control data.

Generally, the techniques described herein are based on the finding that for FDD operation of communication on the wireless link channel reciprocity may not be applicable. In other words, the best DL TX beam may significantly deviate from the best UL RX beam. For example, a spatial coverage associated with the best DL TX beam may differ from a spatial coverage of the best UL RX beam. Here, "best" is used as describing a beam that is superior signal-to-noise properties if compared to other beams having different spatial coverage.

Above, various aspects in the general framework of FDD operation have been described. Next, various inventive concepts will be described that facilitate reliable FDD operation. According to various examples, it is possible to transmit DL RSs (sometimes also we refer to as DL pilot signals) from the BS to the UE in the UL frequency band. The DL RSs can employ precoding. It is possible that the UE acquires some knowledge on the channel transmission matrix based on the DL RSs. Generally speaking, the cellular NW can transmit first DL RSs in the UL frequency band and can transmit second DL RSs in the DL frequency band. The UE can then use the first DL RSs, as well as the second DL RSs, e.g., to make a choice of one or more random-access occasions.

FIG. 1 schematically illustrates a communication system. The communication system includes two nodes 101, 102 that are configured to communicate with each other via a wireless link 114. In the example of FIG. 1, the node 101 is implemented by an access node, more specifically a BS, and the node 102 is implemented by a UE. The BS 101 can be part of a cellular NW (not shown in FIG. 1). As a general rule, the techniques described herein could be used for various types of communication systems, e.g., also for peer-to-peer communication, etc. For sake of simplicity, however, hereinafter, various techniques will be described in the context of a communication system that is implemented by a BS of a cellular NW and a UE.

Communication on the wireless link 114 can employ time-division duplex (TDD) and/or frequency-division duplex (FDD). Using TDD, communication in the DL and in the UL takes place at different points in time using the same frequency. Using FDD, communication in the DL and in the UL takes place at the same point in time, using different frequencies. The inset of FIG. 1 (dashed lines) illustrates respective frequency bands 601, 602 for UL and DL transmission, respectively, in an example configuration.

Communication on the wireless link 114 can employ Orthogonal Frequency Division Multiplex (OFDM) modulation. Here, time-frequency resource grids including multiple time-frequency resources can be defined for each frequency band 601, 602. Each time-frequency resource can correspond to an OFDM symbol/subcarrier.

Figure 2:
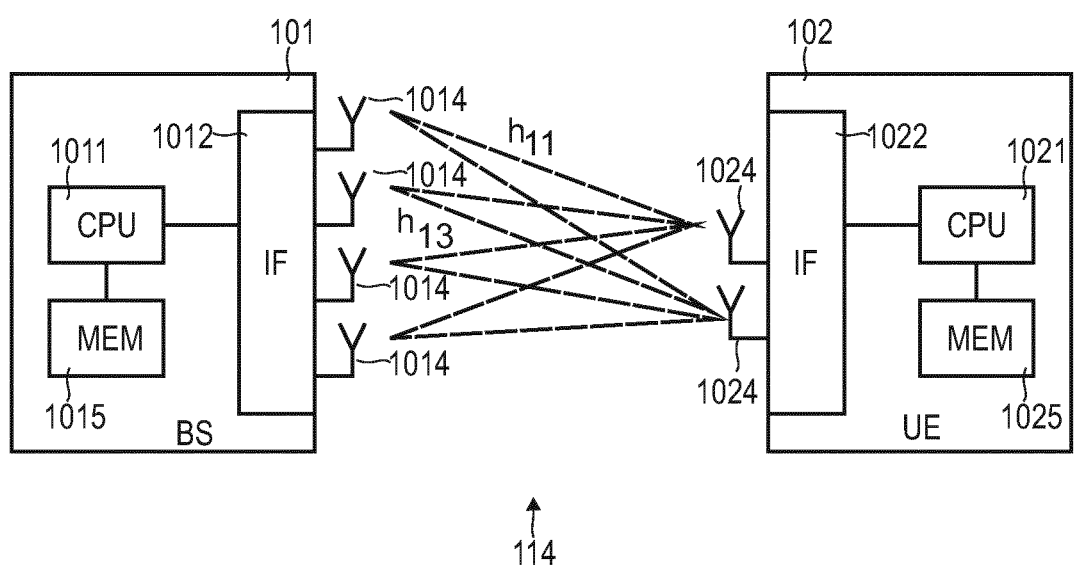
FIG. 2 schematically illustrates MIMO operation of the communication system of FIG. 1 according to various examples.

FIG. 2 illustrates details with respect to the BS 101. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: communicating on a wireless link using MIMO and/or FDD; performing beamsweeps; transmitting signals such as RSs; scheduling signals for transmission on the wireless link; participating in initial access of the UE 102; monitoring for the UE 102 accessing random-access occasions; etc.

FIG. 2 also illustrates details with respect to the UE 102. The UE 102 includes control circuitry that is implemented by a processor 1021 and a nonvolatile memory 1025. The processor 1021 can load program code that is stored in the memory 1025. The processor can execute the program code. Executing the program code causes the processor to perform techniques as described herein, e.g.: communicating on a wireless link using MIMO and/or FDD; performing beamsweeps; participating in an initial access of the UE 102 to the cellular NW of the BS 101; monitoring for RSs, i.e., attempting to receive RSs; selecting one or more randomaccess occasions; etc.

FIG. 2 also illustrates details with respect to communication between the BS 101 and the UE 102 on the wireless link 114. The BS 101 includes an interface 1012 that can access and control multiple antennas 1014. Likewise, the UE 102 includes an interface 1022 that can access and control multiple antennas 1024.

While the scenario of FIG. 2 illustrates the antennas 1014 being coupled to the BS 101, as a general rule, it would be possible to employ transmit-receive points (TRPs) that are spaced apart from the base station.

The interfaces 1012, 1022 can each include one or more TX chains and one or more receiver chains. For instance, such RX chains can include low noise amplifiers, analogue to digital converters, mixers, etc. Analogue and/or digital beamforming would be possible.

Thereby, phase-coherent transmitting and/or receiving (communicating) can be implemented across the multiple antennas 1014, 1024. Thereby, the BS 101 and the UE 102 implement a MIMO communication system.

As a general rule, the receiver of the MIMO communication system receives a signal y that is obtained from an input signal x multiplied by the transmission matrix H. FIG. 2 includes two example labels for the components $h_{11}$ and $h_{13}$ of the transmission matrix H.

The transmission matrix H defines the channel impulse response of the wireless link 114. The rank of the transmission matrix corresponds to the number of linearly independent rows or columns and, as such, indicates how many independent data streams can be used simultaneously; this is sometimes referred to as the number of layers. The rank can be set in different multi-antenna transmission modes. For multi-antenna transmission modes, the amplitude and/or phase (antenna weights) of each one of the antennas 1014, 1024 is appropriately controlled by the interfaces 1012, 1022. The antenna weights can define a certain spatial filter.

For instance, a diversity multi-antenna transmission mode relies on transmitting the same data redundantly using multiple TX antennas. Thus, multiple data streams carry the same data. Thereby, the signal-to-noise ratio can be increased. The redundant signals can be generated using different encoding, e.g., Alamouti encoding.

Another multi-antenna transmission mode is spatial multiplexing. Spatial multiplexing allows to increase the data rate: The data is divided into different data streams and these different data streams can be transmitted contemporaneously over the wireless link 114.

The diversity multi-antenna transmission mode and the spatial multiplexing multi-antenna transmission mode can be described as using multiple beams, the beams defining the spatial data streams. These modes are, therefore, also referred to as multibeam operation. By using a beam, the direction of the signals transmitted by a transmitter of the communication system is controlled. Energy is focused into a respective direction, by phase-coherent superposition of the individual signals originating from each antenna 1014, 1024. Thereby, the spatial data stream can be directed. The spatial data streams transmitted on multiple beams can be independent, resulting in spatial multiplexing MIMO transmission; or dependent on each other, e.g., redundant, resulting in diversity MIMO transmission.

As a general rule, alternatively or additionally to such TX beams, it is possible to employ RX beams.

The concept of beams can be used in so-called beamsweeps. Details with respect to beamsweeping are explained next in connection with FIG. 3 and FIG. 4.

Figure 3:
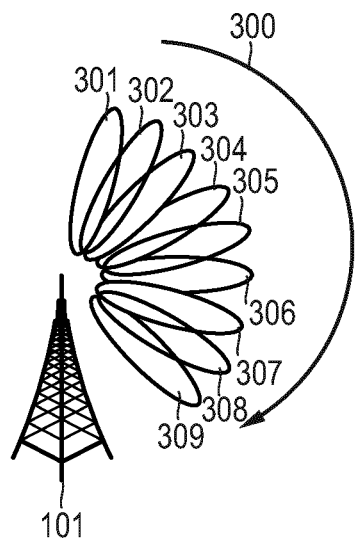
FIG. 3 schematically illustrates a transmit beam sweep of a base station of the communication system according to various examples.

FIG. 3 illustrates DL TX beams 301-309 used by the BS 101. In some examples, the BS 101 can employ a beamsweep 300. Here, the BS 101 activates the beams 301-309 on different resources (e.g., different time-frequency resources, and/or using orthogonal codes) such that the UE 102 can monitor for respective signals transmitted on the DL TX beams 301-309. As a general rule, monitoring for signals can pertain to attempting to receive signals. The UE 102 may then select the best DL TX beam 301-309—e.g., based on a RX property of the received signal, such as amplitude and/or phase and/or angle-of-arrival, etc.—and provide a respective indication to the BS 101. As a general rule, the best DL TX beam 301-309 could be the strongest beam. Also, other quality metrics may be taken into account, e.g., signal-to-noise. Then, subsequent data can be communicated on the selected DL TX beam 301-309. Such beam management can, in particular, be facilitated by using RSs, i.e., signals having a well-defined transmit property such as sequence, amplitude, phase, and/or precoding, etc. RSs are sometimes also referred to as pilot signals.

Figure 4:
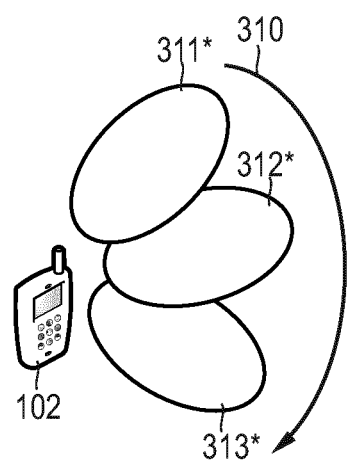
FIG. 4 schematically illustrates a receive beam sweep of a wireless communication device of the communication system according to various examples.

It would be possible that such DL TX beamsweep 300 implemented by the BS 101 is coordinated with a DL RX beamsweep 310 implemented by the UE 102. A DL RX beamsweep 310 is illustrated in FIG. 4. The DL RX beamsweep 310 includes multiple DL RX beams 311*-313* (for sake of simplicity, throughout this text, RX beams are denoted with "*"). The DL RX beamsweep 310 does not necessarily have to be coordinated with a DL TX beamsweep 300.

Figure 5:
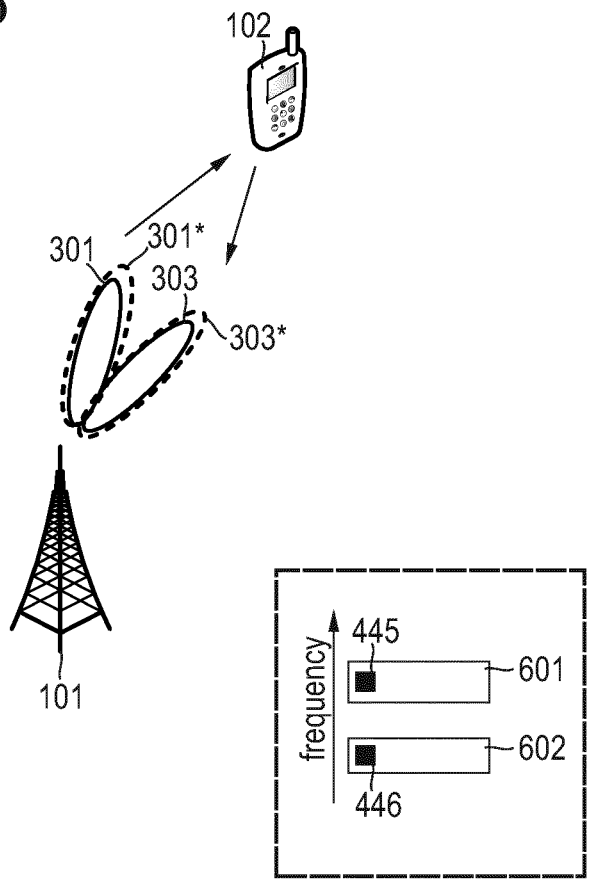
FIG. 5 schematically illustrates nonreciprocal beams used for communicating between the base station and the wireless communication device of the communication system according to various examples.

FIG. 5 schematically illustrates aspects with respect to beam management at the BS 101 according to various examples. FIG. 5 illustrates that the BS 101 transmits DL signals in the DL frequency band 602 using the DL TX beam 301.

Notably, the BS 101 does not use the UL RX beam 301* (dotted line in FIG. 5) that corresponds to the DL TX beam 301 for receiving UL signals in the UL frequency band 601. Rather, the BS uses an UL RX beam 303* that corresponds to a different DL TX beam 303 for receiving UL signals in the UL frequency band 601: Typically, channel reciprocity is not applicable for FDD operation and this is why the BS 101 uses non-corresponding beams 301, 303* for transmitting and receiving, respectively.

The DL TX beam 301 corresponds to the UL RX beam 301*, because the beams 301, 301* have similar spatial filter characteristics and/or use the same antenna weights.

To facilitate beam management, the BS 101 transmits DL reference signals 445, 446 in, both, the UL frequency band 601, as well as in the DL frequency band 602. The UE 102 can monitor for the DL RSs 445, 446 in both frequency bands. The BS 101 can, e.g., transmit the DL RSs 445 using multiple DL TX beams, e.g., using a beamsweep; likewise, the BS 101 may transmit the DL RSs 446 using multiple DL TX beams, e.g., using a beamsweep. In particular, beam management during initial access can be facilitated by such means.

Figure 6:
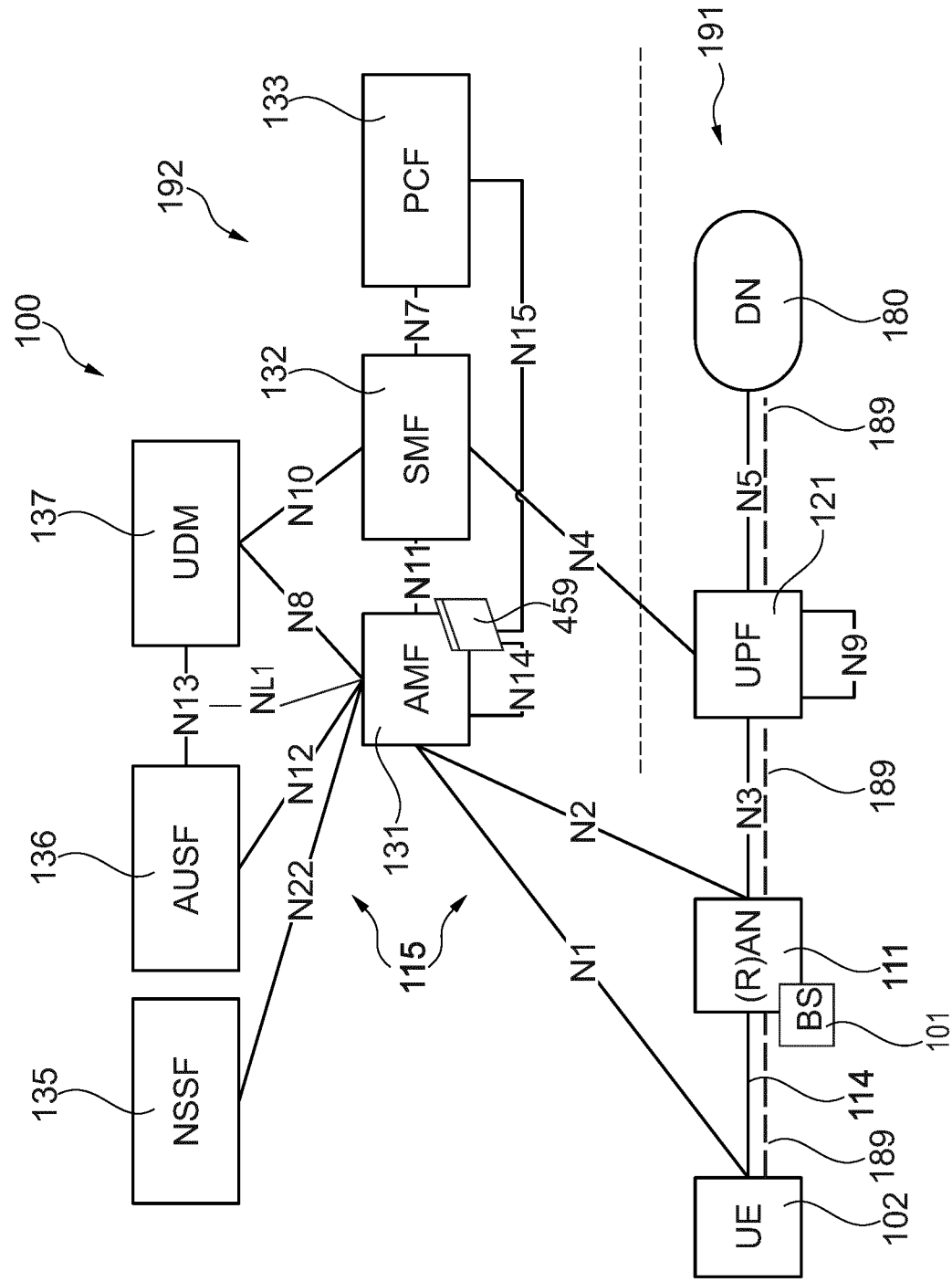
FIG. 6 schematically illustrates a cellular network according to various examples.

FIG. 6 schematically illustrates a cellular NW 100. The example of FIG. 6 illustrates the cellular NW 100 according to the 3GPP NR/5G architecture. Details of the 3GPP 5G architecture are described in 3GPP TS 23.501, version 16.3.0 (2019-12). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 102 is connectable to the cellular NW 100 via a data connection. For example, the UE 102 may be one of the following: a cellular phone; a smart phone; an IOT device; a MTC device; a sensor; an actuator; etc.

The UE 102 is connectable to a core NW (CN) 115 of the cellular NW 100 via a RAN 111, typically formed by one or more BSs 101 (only a single BS 101 is illustrated in FIG. 1 for sake of simplicity). A wireless link 114 is established between the RAN 111—specifically between one or more of the BSs 101 of the RAN 111—and the UE 102.

The wireless link 114 implements a time-frequency resource grid. Typically, OFDM is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels or RSs of the wireless link 114. Examples include: Physical DL Shared Channel (PDSCH); Physical DL Control Channel (PDCCH); Physical UL Shared Channel (PUSCH); Physical UL Control Channel (PUCCH); channels for random access; etc. For FDD, the PUCCH and PUSCH are communicated on the wireless link 114 in the UL frequency band 601 and the PDCCH and the PDSCH are in the DL frequency band 602 (hence, the names "UL frequency band" and "DL frequency band").

The CN 115 includes a user plane (UP) 191 and a control plane (CP) 192. Application data—e.g., of a data service—is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW (DN) 180, e.g., the Internet or a Local Area NW. Application data can be communicated between the UE 102 and one or more servers 181 of the data NW 180. The server 181 can execute an application that provides a service associated with the application data.

The cellular NW 100 also includes a mobility-control node, here implemented by an Access and Mobility Management Function (AMF) 131. The cellular NW 100 also includes a session-control node, here implemented by a Session Management Function (SMF) 132. The cellular NW 100 further includes a Policy Control Function (PCF) 133; a NW Slice Selection Function (NSSF) 135; an Authentication Server Function (AUSF) 136; and a Unified Data Management (UDM) 137.

FIG. 6 also illustrates the protocol reference points N1-N22 between these nodes.

The AMF 131 provides one or more of the following functionalities: connection management sometimes also referred to as registration management; NAS termination for communication between the CN 115 and the UE 102; connection management; reachability management; mobility management; connection authentication; and connection authorization. After UE registration to the NW, the AMF 131 creates a UE context 459 and keeps this UE context, at least as long as the UE 102 is registered to the cellular NW 100. The UE context 459 can hold one or more identities of the UE 102 (UE ID), e.g., temporary identities.

The SMF 132 supports a data connection 189. The data connection 189 is established by the SMF 132 if the respective UE 102 operates in a connected connection mode. The data connection 189 is established on the wireless link 114. The wireless link 114 can pertain to the underlying physical medium and the data connection 189 can include a set of logical channels, scheduling rules, etc. The data connection 189 may include one or more data flows or bearers such as a dedicated data flow/bearer or a default data flow/bearer. The state of the data connection is also defined on the RRC layer, e.g., generally Layer 3 of the OSI model. The SMF 132 provides one or more of the following functionalities: session management including session establishment, modify and release, including data flow/bearer set up of UP data flows/bearers between the RAN 111 and the UPF 121; selection and control of UPFs; configuring of traffic steering; etc.

Figure 7:
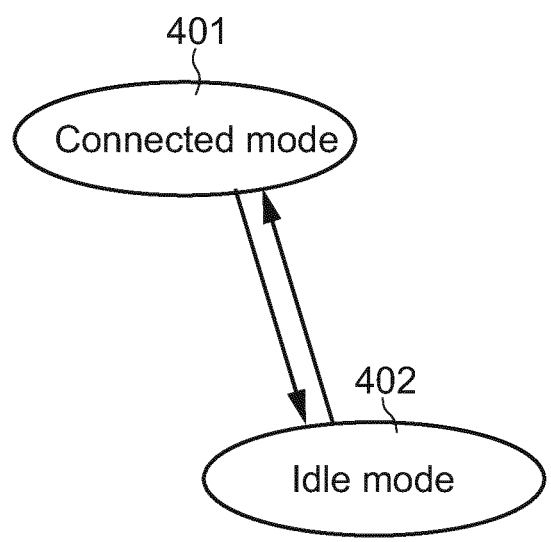
FIG. 7 schematically illustrates multiple connection modes in which the wireless communication device can be operated according to various examples.

FIG. 7 illustrates aspects with respect to different connection modes 401-402 in which the UE 102 can operate according to various examples. When operating in the connected connection mode 401, the data connection 189 between the UE 102 and the cellular NW 100 is established. Application data can be communicated to and from the UE 102. A transition into the connected connection mode 401 is referred to as initial access.

When operating the UE 102 in the idle connection mode 402, the data connection 189 is released. It would be possible that the AMF 131 maintains the UE context 459. The UE 102 can use a discontinuous reception cycle (DRX) cycle that alternatingly switches the interface 1022 between an inactive state and an active state. The interface 1022—when operating in the inactive state—may not be able to RX any signals. E.g., an amplifier or an analogue to digital converter or parts of the digital front end may be switched off. On the other hand, the interface 1022—when operating in the active state—may be able to RX signals, e.g., paging signals.

To transition from the idle connection mode 402 to the connected connection mode 401, a random-access (RA) procedure may be performed. The RA procedure includes transmitting a RA preamble at a RA occasion (RO). Details with respect to the ROs are illustrated in FIG. 8.

Figure 8:
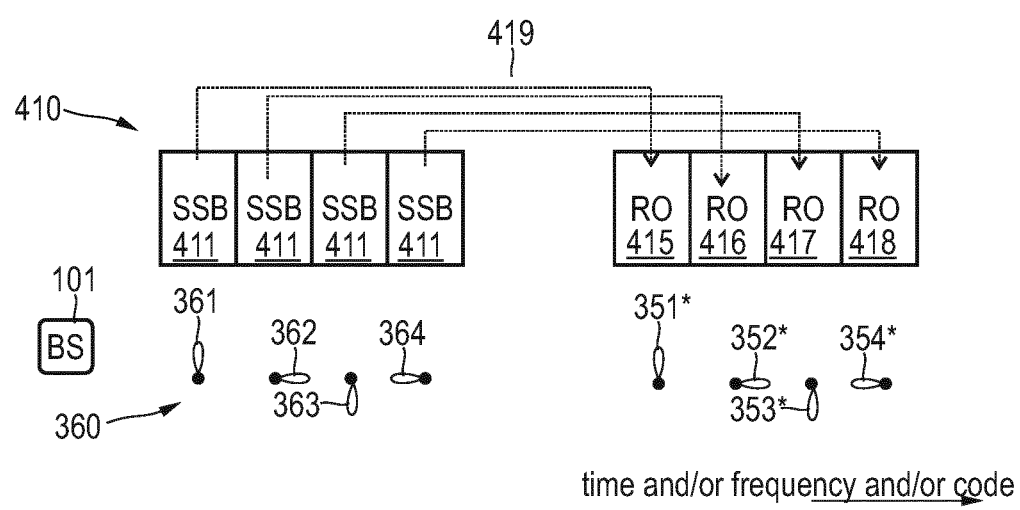
FIG. 8 schematically illustrates multiple random-access occasions for initial access of the wireless communication device to the cellular network according to various examples.

FIG. 8 schematically illustrates aspects with respect to synchronization signal blocks (SSBs). FIG. 8 illustrates that the BS 101 transmits multiple SSBs 411 at different resources, e.g., time-frequency and/or code resources. The SSBs are transmitted in the DL frequency band 602.

The SSBs 411 can facilitate a cell search for the UE 102 during initial access. An SSB 411 can, e.g., include a primary synchronization signal (SS) and a secondary SS. The primary SS and the secondary SS implement RSs. The SSBs 411 can include a physical broadcast channel (PBCH). The PBCH carries a master information block and uses a specific modulation, typically quadrature phase shift keying, for reliable reception.

Within an SSB 411, the primary SS and the secondary SS are for the UE 102 to lock into the correct frequency and time. There is also some identity of the transmitting BS 101 encoded into the combined SS. When in sync, the UE 102 can extract information about the associated RA channel allocation from the PBCH.

The SSBs 411 can be repeatedly or periodically transmitted by the BS 101, e.g., on predefined time-frequency resources of the time-frequency resource grid.

It is possible that a burst 410 of SSBs 411 is transmitted, employing a beamsweep 360 including the DL TX beams 361-364. Thereby, spatial coverage can be increased. Typically, the burst may have a duration of, e.g., up to 5 ms. The periodicity with which the bursts are transmitted may be 20 ms to 160 ms.

The SSBs 411 transmitted on different DL TX beams 361-364 can have a different SSB time index. Thus, different SSBs 411—i.e., having different SSB time indices—are associated with different ROs 415-418.

FIG. 8 also illustrates aspects with respect to the ROs 415-418. As illustrated in FIG. 8, there is an association 419 between SSBs 411 of the burst 410 having different SSB time indices, and multiple ROs 415-418. The different ROs 415-418 are arranged at different times, frequencies or employ different—e.g., orthogonal—codes for the RA preamble.

The association 419 is typically implemented by predefining a number of SSB time indices per RO. This number can be larger than one which corresponds to multiple SSBs being associated with a single RO. The number can also be smaller than one which corresponds to a single SSB corresponding to multiple ROs. The SSBs (e.g., in ascending order of the time index) are then associated with the ROs, firstly, in frequency domain; secondly, in time domain within a slot; and thirdly in time domain between RA slots.

By selecting the appropriate ROs 415-418, the UE 102 can indicate—according to reference implementations—which DL TX beam 361-364 was best. This enables to establish an appropriate beam pair during initial access.

Typically, the BS 101 monitors the ROs 415-418 using UL RX beams **351\*-354\*. These UL RX beams 351\*-354\* can correspond to the DL TX beams 361-364 used for transmitting the SSBs 411, as illustrated in FIG. 8**. For example, the same spatial filter may be used. It would be possible to use the same antenna weights or a scaled version of these antenna weights.

Various techniques are based on the finding that the UE 102 accesses a particular RRO 415-418 by transmitting in the UL frequency band 601. Here, the corresponding UL RX beams **351\*-354\* used by the BS 101 to monitor the RO 415-418—due to nonreciprocity—may not be ideal for receiving the signal transmitted by the UE 102**.

This can impair the signal-to-noise ratio. According to various techniques described herein, such drawbacks can be mitigated.

Figure 9:
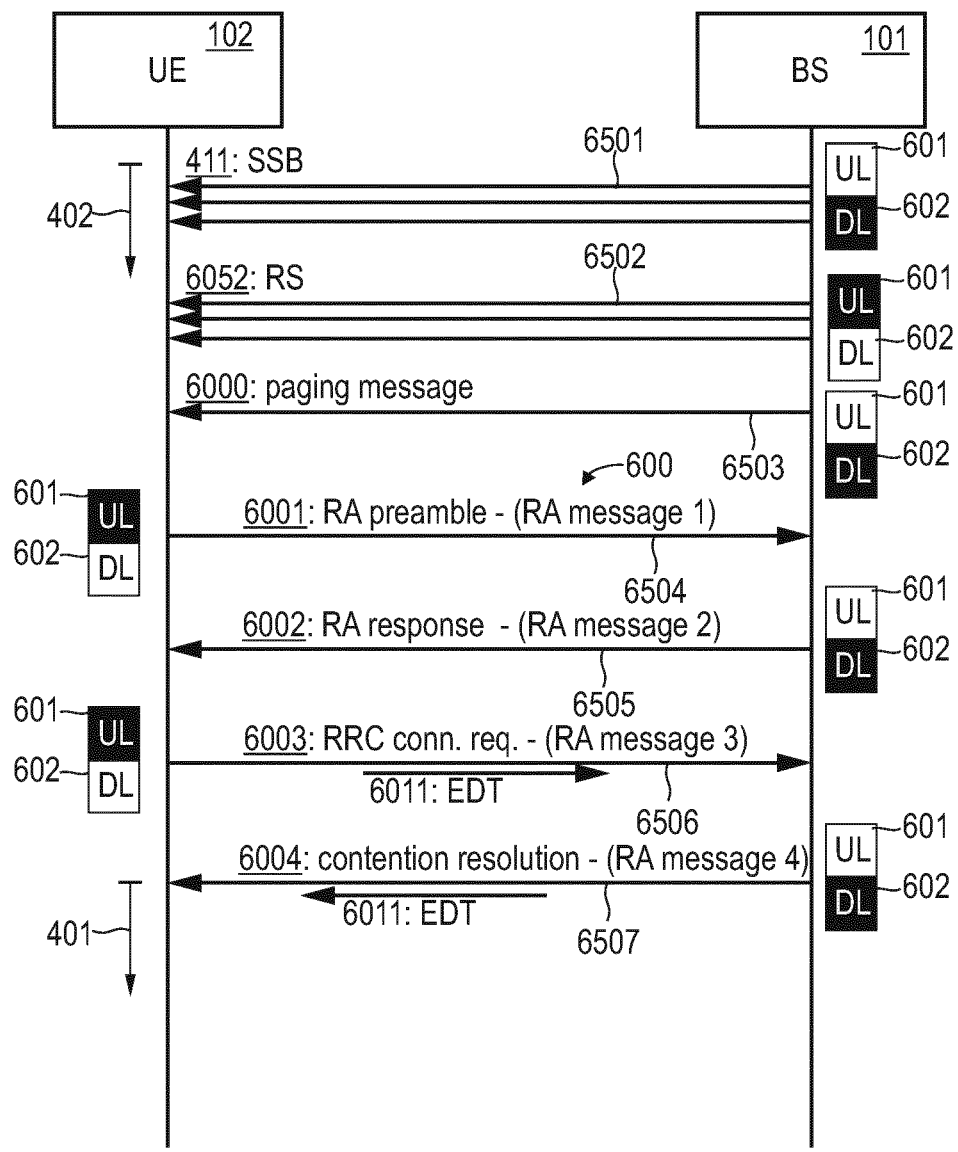
FIG. 9 is a signaling diagram of communicating between the wireless communication device and the cellular network according to various examples.

FIG. 9 is a signaling diagram of communication between the UE 102 and the BS 101.

In the example of FIG. 9, the communication between the BS 101 and the UE 102 on the wireless link 114 uses FDD in the frequency bands 601, 602.

Prior to initiating the RA procedure 600, the UE 102 monitors for SSBs 411 transmitted by the BS 101. This transmission is implemented using a beamsweep, e.g., the beamsweep 360 (cf. FIG. 8). The SSBs 411 transmitted at 6501 thus form a burst 410. The SSBs 411 are transmitted in the DL frequency band 602.

Next, at 6502, DL RSs—here implemented by channel state information RSs (CSI-RSs) 6052—are transmitted. The CSI-RS 6052 are transmitted in the UL frequency band 601. The CSI-RSs 6052 can be transmitted in a burst, using a DL TX beamsweep. It would be possible that scheduling information for the CSI-RS 6052 is included in an information block broadcasted by the BS 101, e.g., in the SSBs 411. More generally, the scheduling information indicative of time-frequency resources that include the CSI-RSs 6052 may be transmitted using control signaling on the DL frequency band 602. Alternatively or additionally to such scheduling information, it would also be possible that configuration information is broadcasted by the BS 101, the configuration information being indicative of whether the transmission of the CSI-RS 6052 is activated or deactivated. For example, some cells of the cellular NW 100 may use the CSI-RSs 6052 being transmitted in the UL frequency band 601, while other cells may not transmit the CSI-RSs 6052 in the UL frequency band 601.

As a general rule, the same or different DL TX beams may be used for transmitting the SSB 411 and the CSI-RS 6052; i.e., the same or different spatial filters may be used.

The UE 102 monitors for the SSBs at 6501 and for the CSI-RSs 6052 at 6502.

Based on the SSBs 411, the UE 102 can synchronize with the BS 101.

The UE 102 can then—optionally—monitor for paging indicators and paging messages (paging signals) 6000. Blind decoding of the PDCCH for receiving the paging indicator can be implemented. Upon receiving the paging signal 6000 at 6503 (in the DL frequency band 602), initial access is then triggered using the RA procedure 600.

Paging signals are one possible trigger criterion for the initial access. Other trigger criteria may be considered alternatively or additionally. For example, power-up or UE-originating data may be other trigger criteria for the initial access.

At 6504, based on the SSBs 411 and the CSI-RSs 6052, the UE 102 transmits a RA preamble to the BS 101, in a respective RAmsg1 6001. This RAmsg1 6001 may be indicative of a temporary identity of the UE 102.

In response to transmitting the RAmsg1 6001, the UE 102 receives, at 6505, a RA response message, the RAmsg2 6002. The RAmsg2 includes a new temporary identity for the UE 102, timing adjustment information, and an UL scheduling grant for time-frequency resources. The UL scheduling grant may be addressed to the UEs 102 RA Radio NW Temporary Identity (RA-RNTI). Using these UL resources indicated by the UL scheduling grant included in the RAmsg2 6002, the UE 102 sends, at 6506, a RRC connection request RAmsg3 6003. In response to the RRC connection request 6003, the UE 102 receives, at 6507, a contention resolution message RAmsg4 6004 to ensure the right UE is addressed. This finalizes or aborts establishment of the data connection 189. The UE 102 is then transitioned into operation into the connected connection mode 402.

Early data 6011—e.g., application data or RRC control data—can be included in the RAmsg3 6003 and/or the RAmsg4 6004.

By transmitting the CSI-RS 6052 in the UL frequency band 601, improved beam management becomes possible. This is explained in connection with FIG. 10.

Figure 10:
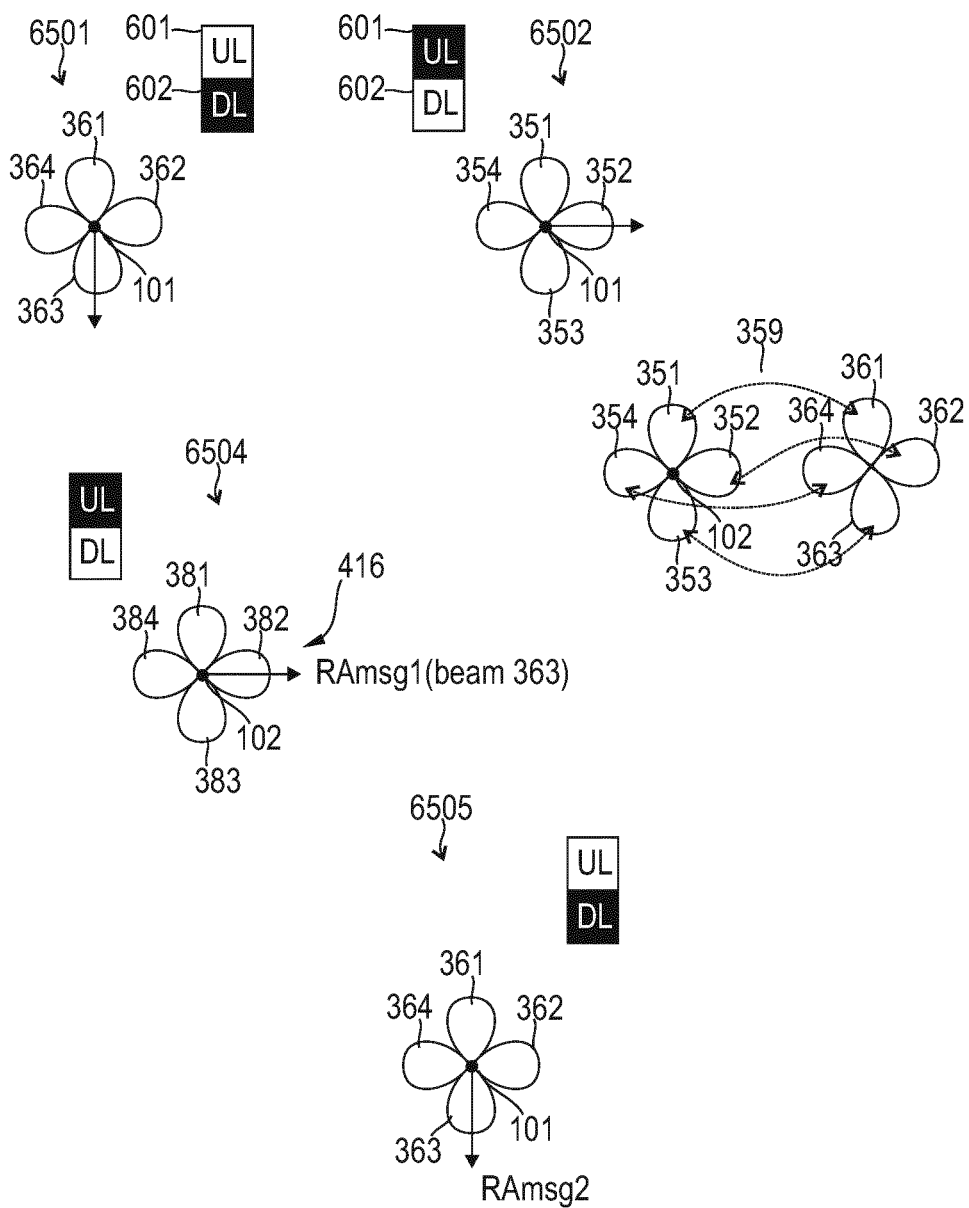
FIG. 10 schematically illustrates logic for beam management at the wireless communication device according to various examples.

FIG. 10 illustrates aspects with respect to the logic at the UE 102 for selecting the appropriate RO 415-418. FIG. 10 illustrates details of FIG. 9.

At 6501, transmission of the SSBs 411 in the DL band 602 using the DL TX beams 361-364 is illustrated (also cf. FIG. 8). As illustrated by the arrow, the UE 102 receives only the SSB 411 transmitted using the TX beam 363.

At 6502, the CSI-RS 6052 are transmitted in a burst, using the DL TX beams 351-354. As a general rule, the DL TX beams 351-354 may be the same or different as the DL TX beams 361-364. I.e., the same or different spatial filters may be used.

As illustrated by the arrow, the UE 102 only receives the CSI-RS 6052 transmitted using the TX beam 352. The CSI-RS 6052 transmitted on the remaining beams 351, 353-354 are not received.

As is apparent from a comparison of the DL TX beams 361-364 and the DL TX beams 351-354, due to the different transmission frequencies, the best spatial characteristic differs between the frequencies in the UL frequency band 601 and the DL frequency band 602.

The DL TX beams 351-354 in the UL frequency band 601 can be mapped to the ROs 415-418. For example, such mapping can be in accordance with one or more mappings and/or the association 419 (cf. FIG. 8); such one or more mappings can be predefined in the standard. The one or more predefined mappings can be fixed, or can depend on certain configuration parameters provided by the cellular NW 100, e.g., in the system information of the BS 101. A few options for such direct or indirect mapping of the DL TX beams 351-354 in the UL frequency band 601 to the ROs 415-418 are illustrated in the TAB. 1 below.

TABLE 1

Various options for mapping from DL TX beams 351-354 in UL frequency band 601 to ROs 415-418

| | |
|---|---|
| A | Mapping: DL TX beams 351-354 in UL frequency band 601 >> DL TX beams 361-364 in DL frequency band 602 DL TX beams 361-364 are associated with SSBs 411 and thus with ROs 415-418 (cf. FIG. 8) |
| B | (Direct) Mapping DL TX beams 351-354 in UL frequency band 601 >> ROs 415-418 |

FIG. 10 also illustrates a mapping 359 between the DL TX beams 351-354 in the UL frequency band 601 and the DL TX beams 361-364 in the DL frequency band 602. FIG. 10 generally corresponds to example A of TAB. 1.

In a simple scenario, the DL TX beams 351-354 are the same as the DL TX beams 361-364. Then, the mapping can reflect this.

Sometimes, different DL TX beams 351-354, 361-364 in the UL frequency band 601 and in the DL frequency band 602. Then, the mapping 359 may be set in accordance with a spatial coverage characteristic of the various DL TX beams 351-354, 361-364: for example, the DL TX beam 351 covers a corresponding spatial surrounding of the BS 101 as the DL TX beam 361 and, accordingly, the DL TX beam 351 is mapped by the mapping 359 to the DL TX beam 361.

As illustrated in FIG. 10, the UE 102 selects—at 6504—the RO 416 for transmitting the RA preamble, i.e., the RA message 1 6001. This selection is based on the monitoring of the CSI-RS 6052 at 6502 (rather than based on the monitoring of the SSBs 411 at 6501). Specifically, the RO 416 is selected, because the CSI-RS 6052 transmitted using the DL TX beam 352 is received (while the CSI-RS 6052 transmitted using the TX beams 351, 353-354 are not received or received at a lower amplitude or lower signal-to-noise ratio).

In detail, the DL TX beam 352 is "seen" at a strong amplitude and/or large signal-to-noise ratio at the UE 102. Because the DL TX beam 352 is in the UL frequency band 601, the assumption is that reception by the BS 101 using the UL RX beam 352* corresponding to the DL TX beam 352 (cf. FIG. 8) also exhibits a large signal-to-noise ratio, i.e., under the assumption of channel reciprocity. The UL RX beam 352* is used by the BS 101 at the RO 416. The RO 416, in turn, is associated with the SSB 411 transmitted using the DL TX beam 362 in the DL frequency band 602. The DL TX beam 362 is mapped to DL TX beam 352. Thus, in other words, based on the monitoring of the CSI-RS 6052 at 6502, the UE 102 can determine the DL TX beam 352. Based on the DL TX beam 362 mapped to the DL TX beam 352 (using the predefined mapping 359), it is then possible to select the RO 416.

As a general rule, the mapping 359 may be indicated in broadcasted information, e.g., an information block included in the PBCH. The mapping 359 could also be fixedly set. The UE 102 can identify the DL TX beam 352, because the CSI-RS 6052 is indicative of the DL TX beam 352. The CSI-RS 6052 may be indicative of the DL TX beam 352, e.g., explicitly—e.g., by using a beam identity in the sequence generation of the CSI-RS 6052—or implicitly—e.g., by using a predefined association between CSI-RSs 6052 and DL TX beams 351-354.

Accordingly, the UE 102 accesses the RO 416. In detail, the UE 102 may transmit the RAmsg1 6001 using the UL TX beam 382; the determining of the UL TX beam 382 is not germane for the functioning of the techniques described herein and is therefore not discussed in detail.

The BS 101 can receive the RAmsg1 6001 transmitted at 6504 using the UL RX beam 352*, during the RO 416.

The UE 102 also provides an indication of the DL TX beam 363 to the BS 101. The DL TX beam 363 has been determined by the UE 102 as the strongest one of the DL TX beams 361-364, based on the monitoring for the SSBs 411. The DL TX beam 363 is determined to be the best beam in the DL frequency band 602. According to reference techniques, this indication would be provided by selecting the RO 417 (cf. FIG. 8). However, as explained above, the RO 416 is selected. Accordingly, the indication of the DL TX beam 363 is provided differently. In the illustrated example, the RAmsg1 6001 is indicative—e.g., by means of preamble partitioning—of the DL TX beam 363. Another option would be to indicate the DL TX beam 363 as part of the EDT 6011 in the RAmsg3 6003.

Accordingly, at 6505, the BS 101 transit the RAmsg2 6002 using the DL TX beam 363.

In the example of FIG. 10, the DL TX beam 363 used for transmitting in the DL frequency band 602 differs from the UL RX beam 352 used for receiving in the UL frequency band 601. The RO 416 thus is not associated with the DL TX beam 363 (rather, it is associated with the DL TX beam 362, cf. FIG. 8). For this reason, the UE 102 provides the explicit indication of the DL TX beam 363. It would be possible that the explicit indication of the DL TX beam 361-364 seen strongest by the UE 102 is only provided if there is a discrepancy between the access RO 415-418 and the DL TX beam 361-364 selected. In other words, it would be possible that the RAmsg1 includes an explicit indicator indicative of the selected DL TX beam 361-364 only if the selected DL TX beam 361-364 is not associated by the association 419 with the accessed RO 415-418.

Figure 11:
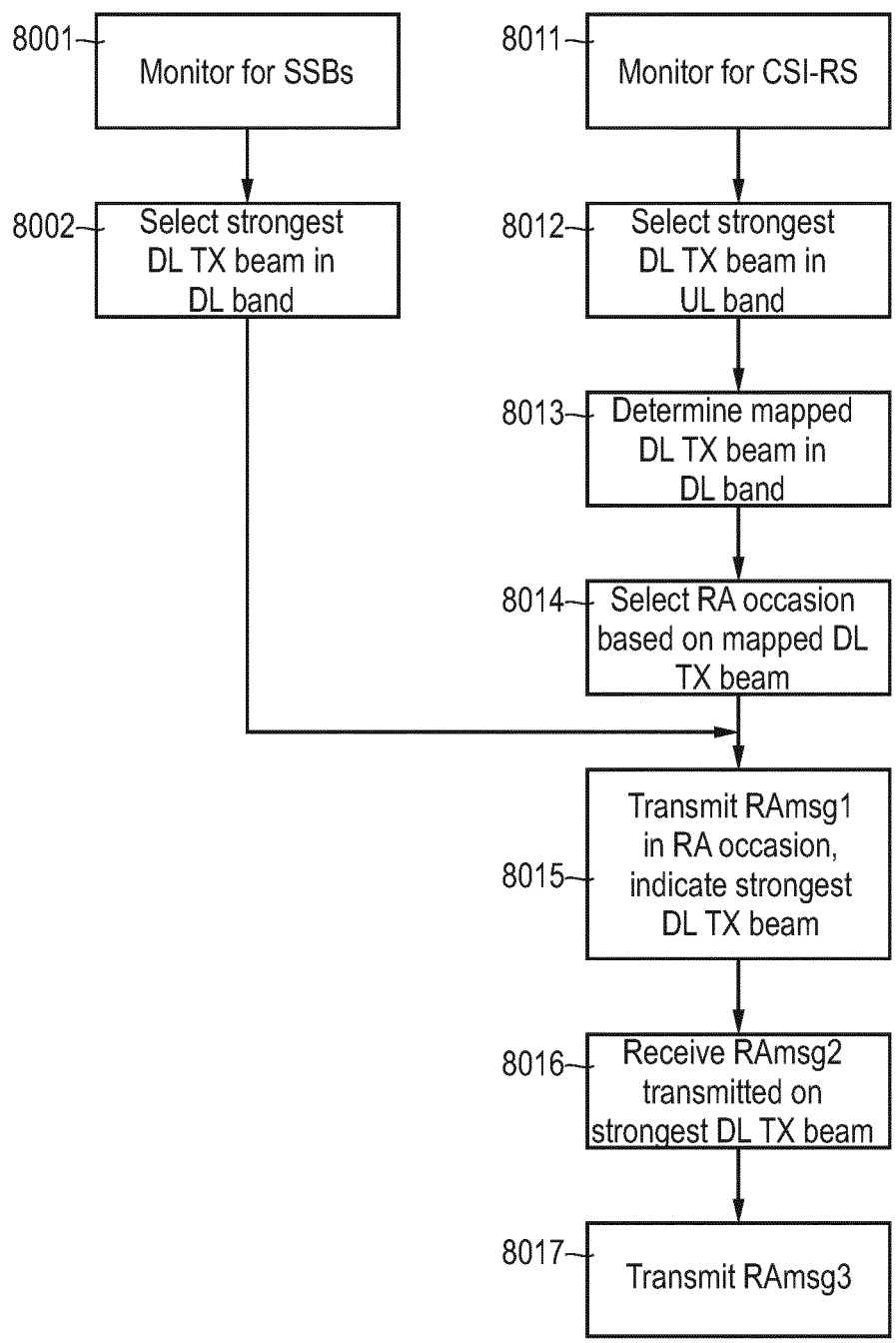
FIG. 11 is a flowchart of a method according to various examples.

FIG. 11 is a flowchart of a method according to various examples. The method of FIG. 11 may be executed by a UE of a communication system. For example, the method of FIG. 11 may be executed by the UE 102. More specifically, it would be possible that the method of FIG. 11 is executed by the processor 1021 of the UE 102, upon loading program code from the memory 1025.

At box 8001, the UE monitors for second RSs in a DL frequency band defined in accordance with FDD operation. For instance, the UE can monitor for the second RSs included in SSBs, e.g., PSS or SSS. The second RSs are transmitted using second DL TX beams in the DL frequency band. See FIG. 9: 6501.

At box 8002, the UE can then select the strongest/best one of the second DL TX beams, e.g., by comparing a receive amplitude among the received second RSs.

At box 8011, the UE monitors for first RSs in an UL frequency band defined in accordance with the FDD operation. For instance, the UE can monitor for CSI-RSs. The first RSs are transmitted using first DL TX beams in the UL frequency band.

At box 8012, the strongest/best first DL TX beam is selected, e.g., based on comparing the receive amplitude among the received first RSs.

Then, at box 8013, a second DL TX beam in the DL frequency band is determined, based on the strongest first DL TX beam that is selected at box 8012. This can be done in accordance with a predefined mapping. For example, details with respect to a possible mapping 359 have been explained in connection with FIG. 10. The second DL TX beam determined at box 8013 may sometimes be different from the selected second DL TX beam of box 8002.

Next, at box 8014, the appropriate RO is selected from multiple ROs, based on the determined second DL TX beam in the DL frequency band of box 8013.

At box 8015, the RAmsg1 is transmitted at the selected RO of box 8014. Preamble partitioning can be used in order to indicate the strongest second DL TX beam, selected at box 8002. Preamble partitioning means that different sets of candidate preambles are available and the selection of a preamble from the given set is indicative of the respective strongest DL TX beam. Box 8115 corresponds to box 8015 (cf. FIG. 11).

Then, at box 8016, the RAmsg2 is received; the RAmsg2 is transmitted using the strongest second DL TX beam selected at box 8002.

At box 8017, the RAmsg3 is transmitted.

Figure 12:
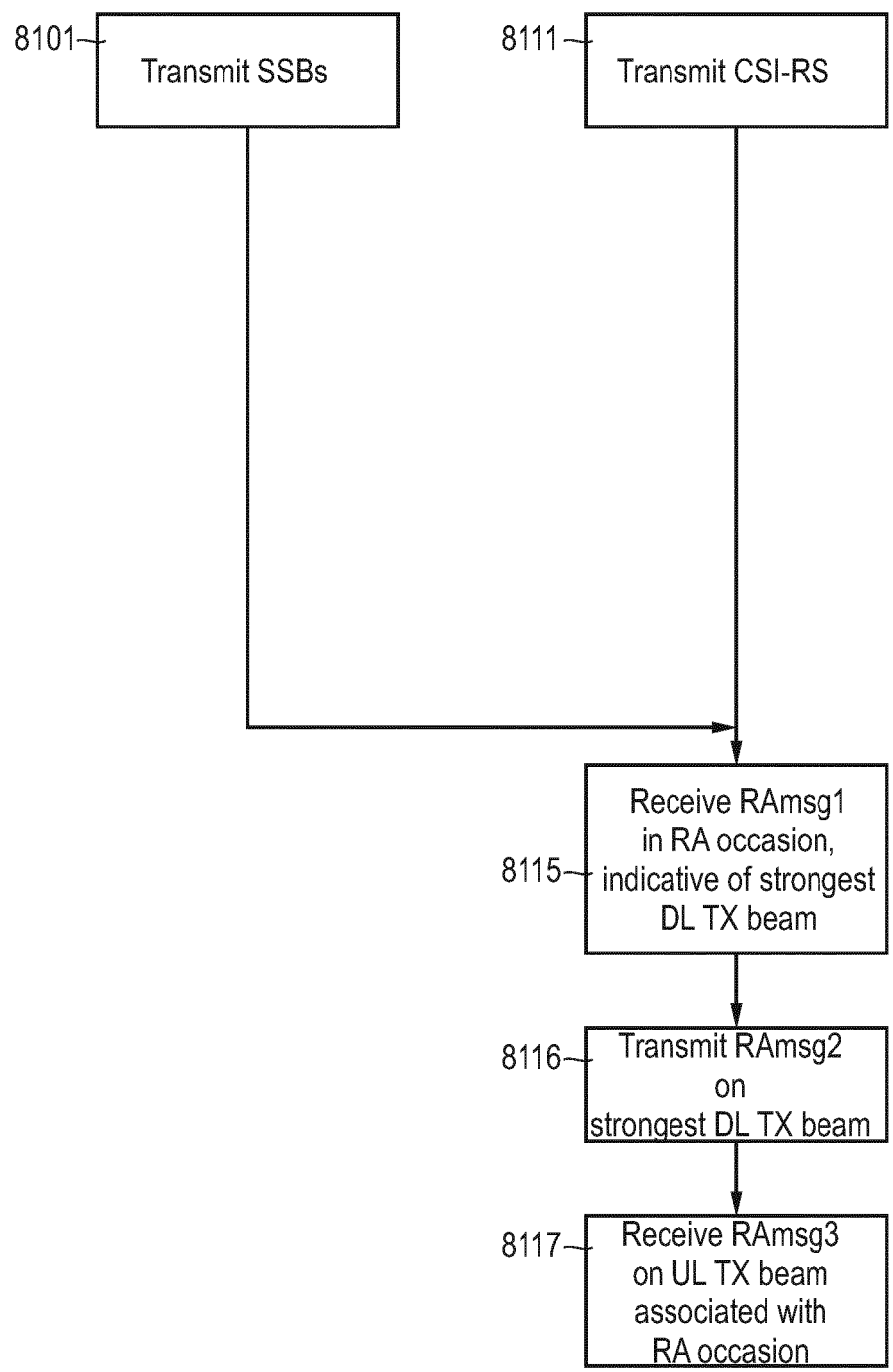
FIG. 12 is a flowchart of a method according to various examples.

FIG. 12 is a flowchart of a method according to various examples. The method of FIG. 12 may be executed by an access node of a communication system. For instance, the method of FIG. 12 may be executed by a BS of a cellular network, e.g., by the BS 101. More specifically, it would be possible that the method of FIG. 12 is executed by the processor 1011 of the BS 101, upon loading program code from the memory 1015.

At box 8101, second DL RSs are transmitted in the DL frequency band. Box 8101 corresponds to box 8001 (cf. FIG. 11).

At box 8111, first DL RSs are transmitted in the UL frequency band. Box 8111 corresponds to box 8011 (cf. FIG. 11).

At box 8115, RAmsg1 is received in an RO. The RAmsg1 is indicative of a strongest DL TX beam. For instance, the RAmsg1 can include a respective explicit indicator or preamble partitioning may be employed; if the RAmsg1 does not explicitly indicate the strongest DL TX beam, the strongest DL TX beam is the one that is associated with the RO in which the RAmsg1 is received (cf. FIG. 8: association 419).

At box 8116, the BS then transmits the RAmsg2 using the strongest DL TX beam as explicitly or implicitly indicated at box 8115.

At box 8117, the RAmsg3 is received. The BS uses the UL RX beam that is associated with the RO in which the RAmsg1 is received at box 8115. In detail, the UL RX beam may be obtained from using the same spatial filter as the DL RX beam used for transmitting the SSB that is associated with the RO in which the Ramsg1 is received at box 8115.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described in connection with DL RSs that are implemented as CSI-RS. However, it is possible to use other kinds and types of DL RSs in connection with the techniques described herein.

For further illustration, various examples have been described in connection with the management for initial access. However, the techniques described herein are not limited to initial access. For example, it would be possible to use DL RSs transmitted in the UL band while the UE operates in the connected connection mode.

For still further illustration, above, various techniques have been described in which a 4-step RA procedure is used. Similar techniques may also be applied for a 2-step RA procedure. As a general rule, the 2-step RA procedure relies on a combination of RAmsg1 and RAmsg3 into RAmsgA, and on a combination of RAmsg2 and RAmsg4 into RAmsgB.

The invention claimed is:

1. A method of operating a wireless communication device configured to communicate with a communications network using frequency duplex transmission in an uplink frequency band and in a downlink frequency band, the method comprising:

monitoring for first downlink reference signals transmitted by an access node of the communications network in the uplink frequency band and using multiple first downlink transmit beams, and monitoring for second downlink reference signals transmitted by the access node of the communications network in the downlink frequency band and using multiple second downlink transmit beams, wherein the second downlink reference signals are transmitted using the multiple second downlink transmit beams being associated with multiple random-access occasions, and wherein the method further comprising:

selecting a random-access occasion from the multiple random-access occasions based on said monitoring of the first downlink reference signals, and transmitting, in the uplink frequency band, a random-access message to the communications network in the selected random-access occasion.

2. The method of claim 1, further comprising:
based on said monitoring of the first downlink reference signals: determining a first downlink transmit beam of the multiple first downlink transmit beams,
wherein the random-access occasion is mapped to the determined first downlink transmit beam.

3. The method of claim 2,
wherein the random-access occasion is selected from the multiple random-access occasions based on a second downlink transmit beam of the multiple second downlink transmit beams that is determined based on a predefined mapping between the multiple first downlink transmit beams and the multiple second downlink transmit beams, or
wherein the random-access occasion is selected from the multiple random-access occasions based on a predefined mapping between the multiple first downlink transmit beams and the multiple random-access occasions.

4. The method of claim 1, further comprising:
based on said monitoring of the second downlink reference signals: selecting a second downlink transmit beam from the multiple second downlink transmit beams, and
providing an indication of the selected second downlink transmit beam to the communications network.

5. The method of claim 4,
wherein the random-access message is indicative of the selected second downlink transmit beam.

6. The method of claim 5,
wherein the random-access message comprises an explicit indicator indicative of the selected second downlink transmit beam if the selected second downlink transmit beam is not associated with the selected random-access occasion.

7. The method of claim 1, further comprising:
receiving scheduling information for the first downlink reference signals in the downlink frequency band.

8. The method of claim 1, further comprising:
receiving a configuration information indicative of transmission of the first downlink reference signals in the uplink frequency band.

9. A method of operating an access node of a communications network, the access node configured to communicate with a wireless communication device using frequency duplex transmission in an uplink frequency band and in a downlink frequency band, the method comprising:
transmitting first downlink reference signals in the uplink frequency band and using multiple first downlink transmit beams, and
transmitting second downlink reference signals in the downlink frequency band and using multiple second downlink transmit beams,
wherein the second downlink reference signals are transmitted using the multiple second downlink transmit beams being associated with multiple random-access occasions, and
wherein the method further comprising:
monitoring, in the multiple random-access occasions, and using multiple uplink receive beams for a random-access message transmitted by the wireless communication device in the uplink frequency band; and
selecting an uplink receive beam from the multiple uplink receive beams based on said monitoring.

10. The method of claim 9, further comprising:
obtaining an indication of a second downlink transmit beam of the multiple second downlink transmit beams from the wireless communication device,
selecting the second downlink transmit beam from the multiple second downlink transmit beams in accordance with the indication.

11. The method of claim 10,
wherein the random-access message provides the indication of the second downlink transmit beam.

12. A wireless communication device configured to communicate with a communications network using frequency duplex transmission in an uplink frequency band and in a downlink frequency band, the wireless communication device comprising control circuitry configured to:
monitor for first downlink reference signals transmitted by an access node of the communications network in the uplink frequency band and using multiple first downlink transmit beams, and
monitor for second downlink reference signals transmitted by the access node of the communications network in the downlink frequency band and using multiple second downlink transmit beams, wherein the second downlink reference signals are transmitted using the multiple second downlink transmit beams being associated with multiple random-access occasions, and
wherein the control circuitry is further configured to:
select a random-access occasion from the multiple random-access occasions based on said monitoring of the first downlink reference signals, and
transmit, in the uplink frequency band, a random-access message to the communications network in the selected random-access occasion.

* * * * *